(12) United States Patent
Jiang et al.

(10) Patent No.: US 11,176,453 B2
(45) Date of Patent: Nov. 16, 2021

(54) SYSTEM AND METHOD FOR DETANGLING OF INTERLEAVED CONVERSATIONS IN COMMUNICATION PLATFORMS

(71) Applicant: FUJIFILM Business Innovation Corp., Tokyo (JP)

(72) Inventors: Jyun-Yu Jiang, Los Angeles, CA (US); Francine Chen, Menlo Park, CA (US); Yin-Ying Chen, Sunnyvale, CA (US); Scott Carter, Menlo Park, CA (US)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 975 days.

(21) Appl. No.: 15/857,404

(22) Filed: Dec. 28, 2017

(65) Prior Publication Data

US 2019/0205743 A1 Jul. 4, 2019

(51) Int. Cl.
*G06N 3/08* (2006.01)
*G06F 16/31* (2019.01)
*G06F 16/9535* (2019.01)
*G06F 16/957* (2019.01)

(52) U.S. Cl.
CPC ............ *G06N 3/08* (2013.01); *G06F 16/313* (2019.01); *G06F 16/9535* (2019.01); *G06F 16/9577* (2019.01)

(58) Field of Classification Search
CPC ................................. G06N 3/08; G06F 16/313
See application file for complete search history.

(56) References Cited

PUBLICATIONS

Nicosia, Massimo et al. "Accurate Sentence Matching with Hybrid Siamese Networks" CIKM '17 [Published Nov. 2017] [Retrieved Apr. 2021] <URL: https://dl.acm.org/doi/10.1145/3132847.3133156#pill-citations_content> (Year: 2017).*
Mueller, Jonas et al. "Siamese recurrent architecture for learning sentence similarity" AAAI'16 [Published 2016] [Retrieved Apr. 2021] <URL: https://dl.acm.org/doi/10.5555/3016100.3016291> (Year: 2016).*
Broadbent, Kara et al. "Record Linkage at NASS using Automatch" USDA [Published 1999] [Retrieved Apr. 2021] <URL: https://nces.ed.gov/FCSM/pdf/IX_A_Broadbent_FCSM1999.pdf> (Year: 1999).*

(Continued)

*Primary Examiner* — Michael J Huntley
*Assistant Examiner* — Fen Christopher Tamulonis
(74) *Attorney, Agent, or Firm* — Procopio, Cory, Hargreaves & Savitch LLP

(57) ABSTRACT

A method of analyzing unstructured messages is provided. The method includes extracting a content feature from an embedding associated with each message from a pair of unstructured messages using a neural network, generating, based on extracted content features, a text similarity score between the pair of messages using a second neural network, combining the generated text similarity score with additional data associated with the messages to generate a total similarity score, and generating a message thread based on the generated total similarity score for the pair of messages selected from the plurality of unstructured messages.

22 Claims, 16 Drawing Sheets
(11 of 16 Drawing Sheet(s) Filed in Color)

(56) References Cited

PUBLICATIONS

Feng, Chong "Improve Record Linkage Using Active Learning Techniques" Australian National University [Published 2016] [Retrieved Apr. 2021] <URL: https://cs.anu.edu.au/courses/csprojects/16S2/Reports/Chong_Feng_Report.pdf> (Year: 2016).*

Domeniconi, Giacomo et al "A novel method for Unsupervised and Supervised Conversational Message Thread Detection" Data 2016 [Published 2016] [Retrieved Apr. 2021] <URL: https://dl.acm.org/doi/abs/10.5220/0006001100430054> (Year: 2016).*

Das, Arpita et al. "Together we stand: Siamese Networks for Similar Question Retrieval" ACL 2016 [Published 2016] [Retrieved Apr. 2021] <URL: https://www.aclweb.org/anthology/P16-1036/> (Year: 2016).*

Bhatia, Sumit et al. "Adopting Inference Networks for Online Thread Retrieval." AAAI-10 [Published 2010][Retrieved Apr. 2021] <URL: https://aaai.org/ocs/index.php/AAAI/AAAI10/paper/viewFile/1886/2199> (Year: 2010).*

Singh, Amit et al. "Retrieving Similar Discussion Forum Threads: A structure based approach" SIGIR '12 [Published 2012] [ Retrieved Apr. 2021] <URL: https://dl.acm.org/doi/pdf/10.1145/2348283.2348305> (Year: 2012).*

Seo, Jangwon "Online community search using conversational structures" IR '11 [Published 2011] [Retrieved Apr. 2021] <URL: https://dl.acm.org/doi/abs/10.1007/s10791-011-9166-8> (Year: 2011).*

Buch, Lutz et al. "Approximate String Matching by End-Users using Active Learning" CKIM '15 [Published 2015] [Retrieved Apr. 2021] <URL: https://dl.acm.org/doi/10.1145/2806416.2806453> (Year: 2015).*

Shikib Mehri et al., "Chat Disentanglement: Identifying Semantic Reply Relationships with Random Forests and Recurrent Neural Networks", Taipei, Taiwan, pp. 615-623, Nov. 27-Dec. 1, 2017 (9 pages).

Erik Aumayr et al., "Reconstruction of Threaded Conversations in Online Discussion Forums", Proceeding of the Fifth International AAAI Conference on Weblogs and Social Media,htttp://www.internetbrands.com; pp. 26-33 (2011) (8 Pages).

Micha Elsner et al., "Disentangling Chat", Computational Linguistics, vol. 36, No. 3, pp. 389-409 (Mar. 3, 2010) (22 pages).

Micha Elsner et al., "Disentangling Chat with Local Coherence Models", Proceeding of the 49th Annual Meeting of the Association for Computational Linguistics, pp. 1179-1189, Portland, Oregon, Jun. 19-24, 2011 (11 pages).

Florian Laws et al., "Active Learning with Amazon Mechanical Turk", Proceedings of the 2011 Conference on Empirical Methods in Natural Language Processing, pp. 1546-1556, Edinburgh, Scotland, UK, Jul. 27-31, 2011 (11 pages).

Aliaksei Severyn et al., "Learning to Rank Short Text Pairs with Convolutional Deep Neural Networks", SIRGIR'15, Aug. 9-13, 2015, Santiago, Chile (10 pages).

Mingxuan Sun et al., "Learning Multiple-Question Decision Trees for Cold-Start Recommendation", WSDM'13, Feb. 4-8, 2013, Rome, Italy (10 pages).

Shuohang Wang et al., "A Compare-Aggregate Model for Matching Text Sequences", ICLR 2017, https://github.com/shuohangwang/SeqMatchSeq, Nov. 6, 2016, (10 pages).

Lidan wang et al., Context-based Message Expansion for Disentanglement of Interleaved Text Conversations, Human Language of Technologies: The 2009 Annual Conference of the North American Chapter of the ACL, pp. 200-208, Boulder, Colorado, Jun. 2009 (9 pages).

* cited by examiner

SYSTEM AND METHOD FOR DETANGLING OF INTERLEAVED CONVERSATIONS IN COMMUNICATION PLATFORMS

BACKGROUND

Field

The present disclosure relates to electronic communication systems, and more specifically, to systems and methods of detangling interleaved conversations in electronic communication systems.

Related Art

In related art chat platforms (e.g., message boards, instant messaging systems, etc.) users may post their comment or message onto unstructured message channels corresponding to general "topics". For example, users may post when convenient, often interjecting or interrupting an on-going, sometimes asynchronous, conversation. The resulting interleaved conversations make it difficult to quickly follow a conversation of interest and also make it difficult for chat platform systems to automatically summarize individual conversations. The ability to "detangle" conversations can make it easier for users to understand and follow conversations. Detangling can also be important to a number of applications that help users to better browse chat channels, understand what has been discussed, as well as for better presentation of relevant posts in response to search and for summarization of individual conversations within a channel.

In the related art, automatically detangling the interleaved conversations may be difficult. Some related art methods of detangling have looked at meta-data (such as "Author" or "Time") associated with messages or posts as features to use for detangling. Other related art methods have relied on usage of the same terms and phrases in the messages for detangling. Still other related art methods rely on determining similarity of questions and answers associated with the posts to perform detangling. However, existing methods do not fully address the difficulties associated with detangling the interleaved conversations.

SUMMARY OF THE DISCLOSURE

Aspects of the present application may relate to a method of analyzing unstructured messages. The method may include extracting a content feature from an embedding associated with each message from a pair of unstructured messages using a neural network, generating, based on extracted content features, a text similarity score between the pair of messages using a second neural network, combining the generated text similarity score with additional data associated with the messages to generate a total similarity score, and generating a message thread based on the generated total similarity score for the pair of messages selected from the plurality of unstructured messages.

Additional aspects of the present application may relate to a non-transitory computer readable medium having stored therein a program for making a computer execute a method of analyzing a corpus comprising a plurality of unstructured messages. The method may include extracting a content feature from an embedding associated with each message from a pair of unstructured messages using a neural network, generating, based on extracted content features, a text similarity score between the pair of messages using a second neural network, combining the generated text similarity score with additional data associated with the messages to generate a total similarity score, and generating a message thread based on the generated total similarity score for the pair of messages selected from the plurality of unstructured messages.

Further aspects of the present application may relate to a computer apparatus configured to analyze a corpus comprising a plurality of unstructured messages. The computer apparatus may include a memory storing a plurality of unstructured messages and an embedding associated with each of the plurality of unstructured messages, and a processor executing a process. The processor may include extracting at least one content feature from an embedding associated with each the plurality of unstructured messages using a neural network, generating, based on the extracted content features, a text similarity score between a pair of messages, each message selected from the plurality of unstructured messages using a second neural network, combining the generated text similarity score with additional data associated with each pair of messages to generate a total similarity score for each pair of messages, and generating at least one message thread based on the generated total similarity score for at least one pair of messages selected from the plurality of unstructured messages.

Further aspects of the present application may relate to a computer apparatus configured to analyze a corpus comprising a plurality of unstructured messages. The computer apparatus may include a memory storing a plurality of unstructured messages and an embedding associated with each of the plurality of unstructured messages, means for extracting at least one content feature from an embedding associated with each the plurality of unstructured messages using a neural network, means for generating, based on the extracted content features, a text similarity score between a pair of messages, each message selected from the plurality of unstructured messages using a second neural network, means for combining the generated text similarity score with additional data associated with each pair of messages to generate a total similarity score for each pair of messages, and means for generating at least one message thread based on the generated total similarity score for at least one pair of messages selected from the plurality of unstructured messages.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 10 illustrates another UI in accordance with example implementations of the present application.

FIG. 11 illustrates another UI in accordance with example implementations of the present application.

DETAILED DESCRIPTION

Figure 1:
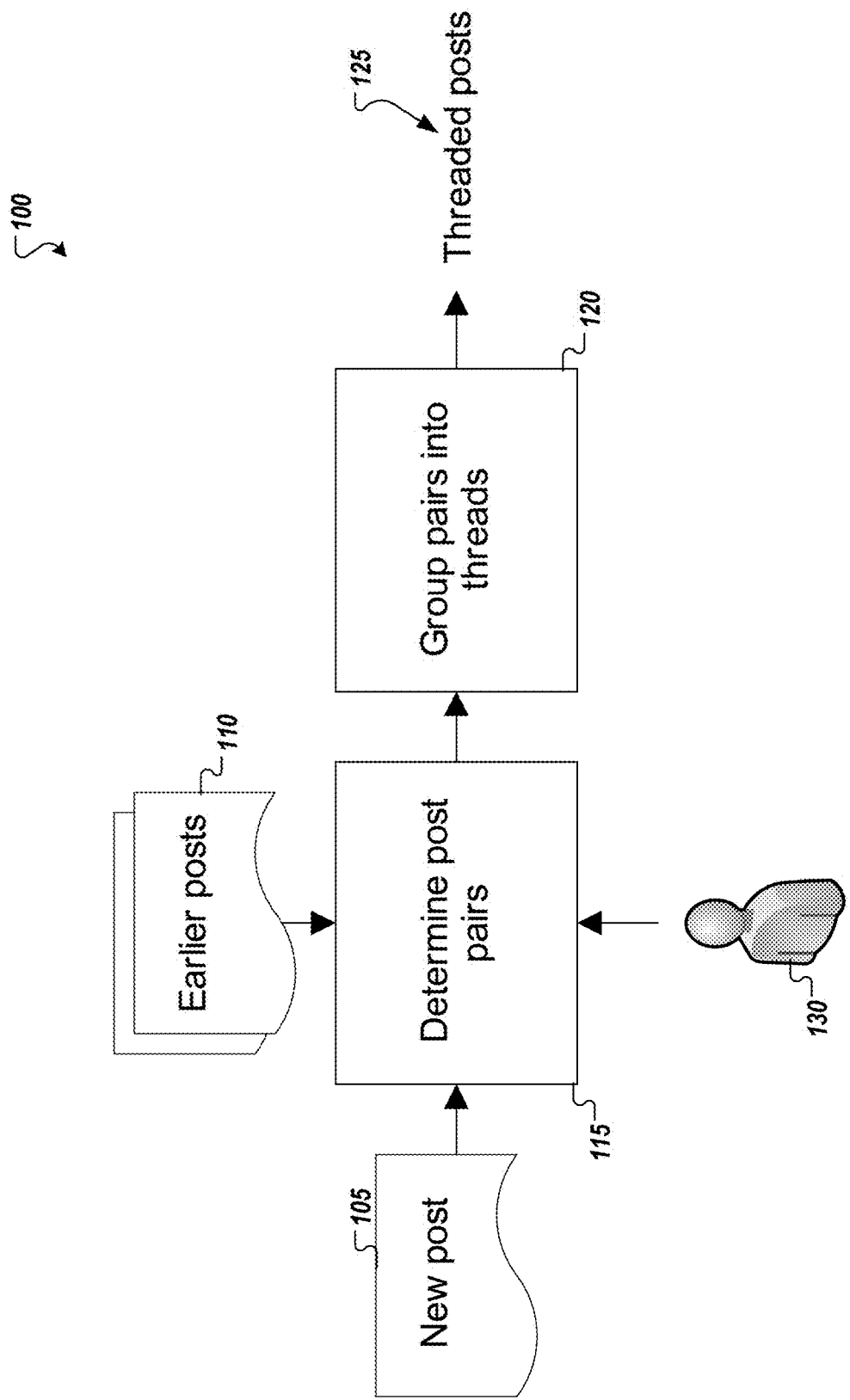
FIG. 1 illustrates a schematic diagram for a process for threading conversations in accordance with an example implementation of the present application.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

To improve automatic conversational thread detangling, embodiments of the present application may provide a process of extracting features from embeddings associated with each post using a first neural network, comparing extracted features associated with different posts to generate a text similarity score with a second neural network, combining the calculated text similarity score with other metadata to generate a total similarity score and generating new threads based on the generated total similarity scores.

Further, in some example implementations, example implementations may infrequently query the user using a User interface (for example, an extension of the posting, messaging, or chat interface). In some example implementations, two types of queries may be presented as a pop-up when the user is typing a post: (1) asking the user whether the post they have typed is in response to a previous post or (2) asking the user whether the post they have typed is a new thread. To minimize annoying the user, the number of queries may be limited and only the most uncertain data points to the de-threading process may be presented, as a form of active learning by the neural networks.

The feedback and better detangling of conversations can be used for providing users optional notifications, such as when a post has been replied to or a new thread has been started, or for displaying the posts in each thread in some example implementations. An alternative input interface may allow a user to assign a new comment to a thread with a single click in some example implementations.

FIG. 1 illustrates a schematic diagram 100 for a process for semi-supervised detangling or threading conversations in accordance with an example implementation of the present application. As illustrated, in some example implementations, a new post 105 is combined with a plurality of earlier posts 110 to determine post pairs 115. The "determine post pairs" 115 component refers to the process discussed below with respect to FIG. 3. As discussed below, during determining post pairs 115, similarity of pairs of posts may be calculated, and in some cases, a user 130 may be asked to match pairs of posts. Based on the determined post pairs, the posts may be grouped into threads at 120 and threaded posts 125 may be output. In some example implementations, one or more neural networks may be used to determine the post pairs 115 and group the pairs into threads 120.

Figure 2:
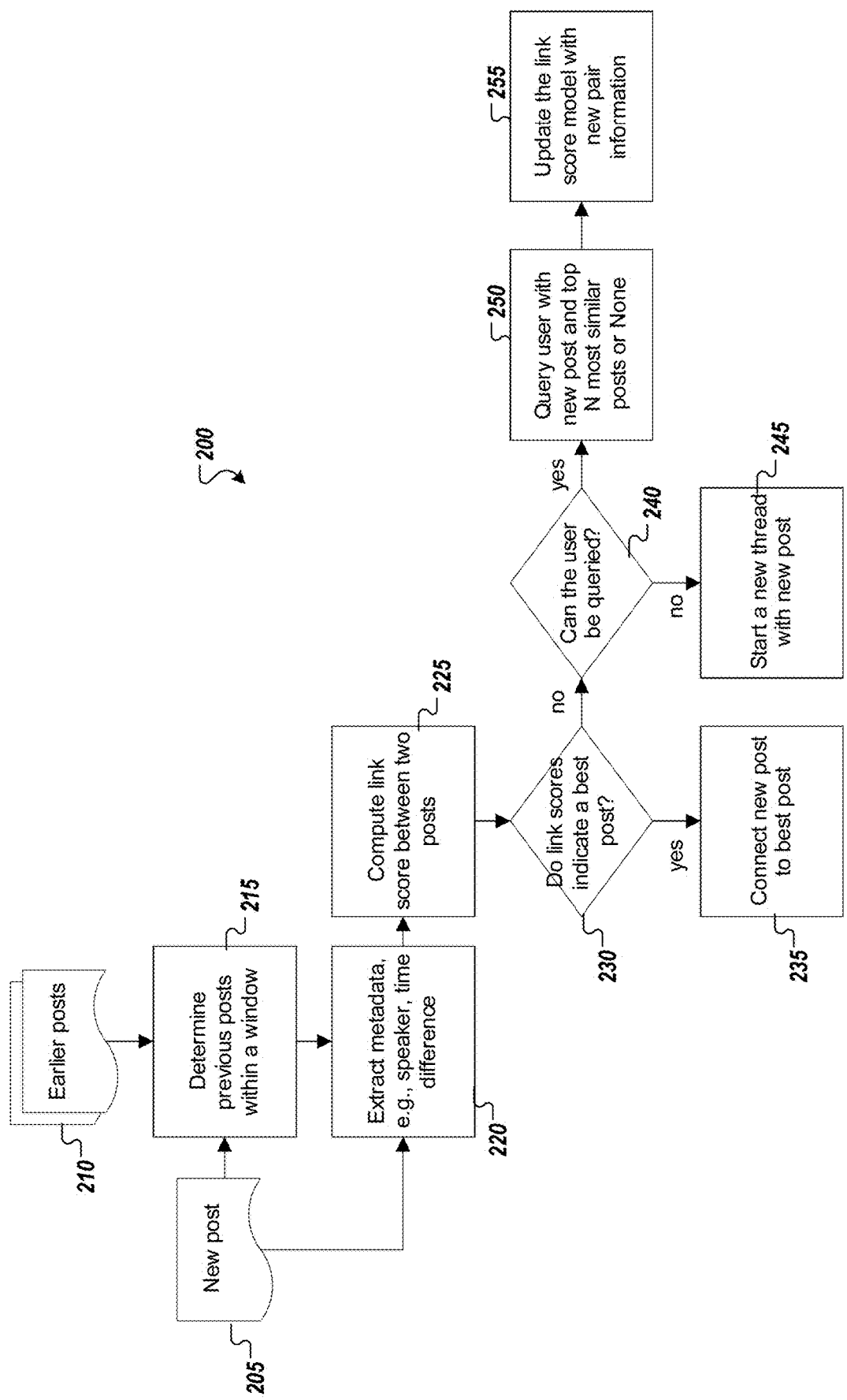
FIG. 2 illustrates a flow chart for a process for identifying pairs of posts that should be part of the same thread according to example implementations of the present application.

FIG. 2 illustrates a flow chart for a process 200 of using active learning to identify pairs of posts that should be part of the same conversation or thread according to example implementations of the present application. The process may be performed by a computing device such as the computing device 1505 in the computing environment 1500 of FIG. 5. As with the approach discussed above with respect to FIG. 1, one or more new posts 205 are received and added to a corpus of earlier posts 210 already a part of the chat or messaging platform. At 215, as the one or more new post 205 are added to the chat or messaging platform, the earlier posts 210 within a specific window relative to the new post 205 are identified. In some example implementations, the specific window may be based on a time window (e.g., ±2 days) preceding or following the new post 205. In other example implementations, the specific window may be based on a number or quantity of posts regardless of time (e.g., ±100 messages).

Once the earlier posts 210 within the window are determined, metadata may be extracted from both the new post 205 and the earlier posts 215 at 220. The extracted metadata may include speaker or author information, time information, location information, or any other metadata information that a person of ordinary skill in the art may find apparent.

Figure 4:
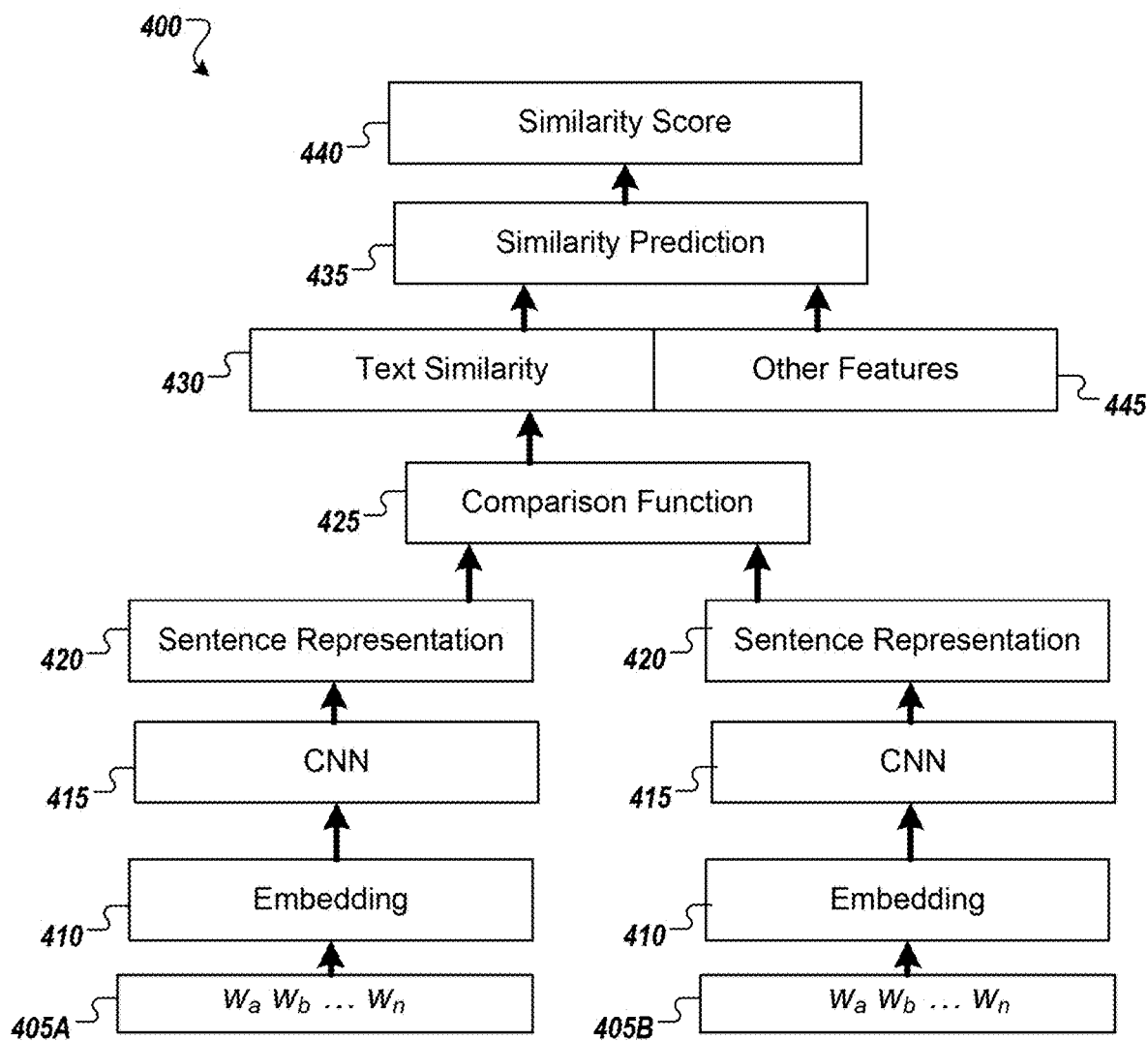
FIG. 4 illustrates schematic diagram of a Siamese neural network in accordance with example implementations of the present application.

At 225, a neural network (for example, a Siamese network as illustrated in FIG. 4 below) may be used to estimate a textual similarity between the new post and each of the posts that have been identified to be within the window at 215 above. The textual similarity may be combined with other non-textual features extracted from the metadata to estimate an overall of total similarity score for each pairs of posts.

In some example implementations, word-embedding using deep learning techniques may be employed to represent the words in a post. This may allow for similar words to have high similarity, unlike earlier term vector methods. Sequence representation methods (e.g., Convolutional Neural Network (CNN) or Long-Short Term Memory (LSTM) with attention) may be used to capture the important parts of posts. This network is used as a subnetwork in a Siamese network.

To predict which thread, if any, a post in a chat platform is a member of a Siamese network may be used to estimate the textual similarity of the new post and each of the posts that have been identified to be within the window. The textual similarity is then combined with other non-textual features to estimate the overall similarity of pairs of posts.

To address the sparseness in term vectors, we employ word-embedding from deep learning to represent the words in a post. These methods allow similar words to have high similarity, unlike related art term vector methods. Further, in some example implementations, sequence representation methods (e.g., Convolutional Neural Network (CNN) or Long-Short Term Memory (LSTM) with attention) may be used to capture the important parts of posts. These neural networks may be used as a subnetwork in a Siamese network, such as the Siamese network illustrated in FIG. 4 below.

The Siamese subnetwork may encode each word in a post into an embedding that is initialized using, for example the fasttext word vectors in crawl-300d-2M.vec. In some example implementations, a CNN or LSTM with attention may be used to extract features based on the textual and contextual data representing a post. The extracted features may be compared and a vector or score representing the textual similarity of the two posts is computed and used to determine whether the posts may be connected in the same thread. In some example implementations, this textual similarity feature may be combined with other features based on meta-data and may also include one or more of:

IDF-weighted word overlap
Distance in time between the two posts
# of other posts between the two posts
The authors of the two posts, or whether they are the same These features may then be used to compute the similarity score between the two posts published closely in time or number of posts at 225. The scores for a given new post are then examined at 230. If the similarity score is above a threshold (yes at 230), the new post 210 is connected to the highest score posts (e.g., the most similar posts). For each new post and the links of the new post to recent earlier posts, the model predicts (1) the thread to which a post is most similar and (2) whether the post is the start of a new thread.

Some example implementations assign posts to existing topics by performing clustering using a method that can examine all individual pairs and clusters on a "global" level. For example, in the clustering process, a graph consisting of all posts may be generated based on the similarity scores between pairs of posts. After identifying subgraph clusters, each cluster can represent a thread of posts.

Conversely, if the similarity score is below the threshold (No at 230), a new thread may be hypothesized. In some implementations, a user may be infrequently queried when the similarity score is below the threshold (No at 230) to improve the performance of the detangling process. However, to minimize annoying the user, the number of queries is limited and only the most uncertain data points to the model are presented.

More specifically, at 240 a determination may be made whether to query the user or not. For example, with similarity scores closer to 0.5 and with no post with high similarity a determination to perform a query (yes at 240) may be made. Alternatively, a post with high confidence could be also infrequently presented (yes at 240) as well for retaining the trust of users to the system. At 250 a query may be provided. For example, a pop-up query may be provided to be easily answered since the user has just constructed a post and should know whether they are responding to an earlier post. Optionally, to minimize clicking, the pop-up disappears when an option is selected, the user continues typing, or the user clicks outside the pop-up.

At 250, two types of queries that may be presented when the user is has just sent a post: (1) asking the user whether the post they are sending is in response to a previous post or (2) asking the user whether the post they are sending is a new thread. These two query types could also be presented together as illustrated below in FIG. 5.

Optionally in some example implementations, additional queries can be used during grouping to identify threads, but if the pair performance (e.g., similarity) is high enough, this may not be necessary. In other example implementations, a user may be queried who they are responding to, which can be used to limit the existing posts to consider for linking grouping.

Further, in some example implementations, the Siamese neural network model may be updated based on the results of the query to refine the determination of similarity scores in the future at 255. Returning to 240, if the user has been queried frequently recently, or if the similarity score has a low confidence layer, the process 200 may proceed to 245 and a new thread started without querying the user.

Figure 3A:
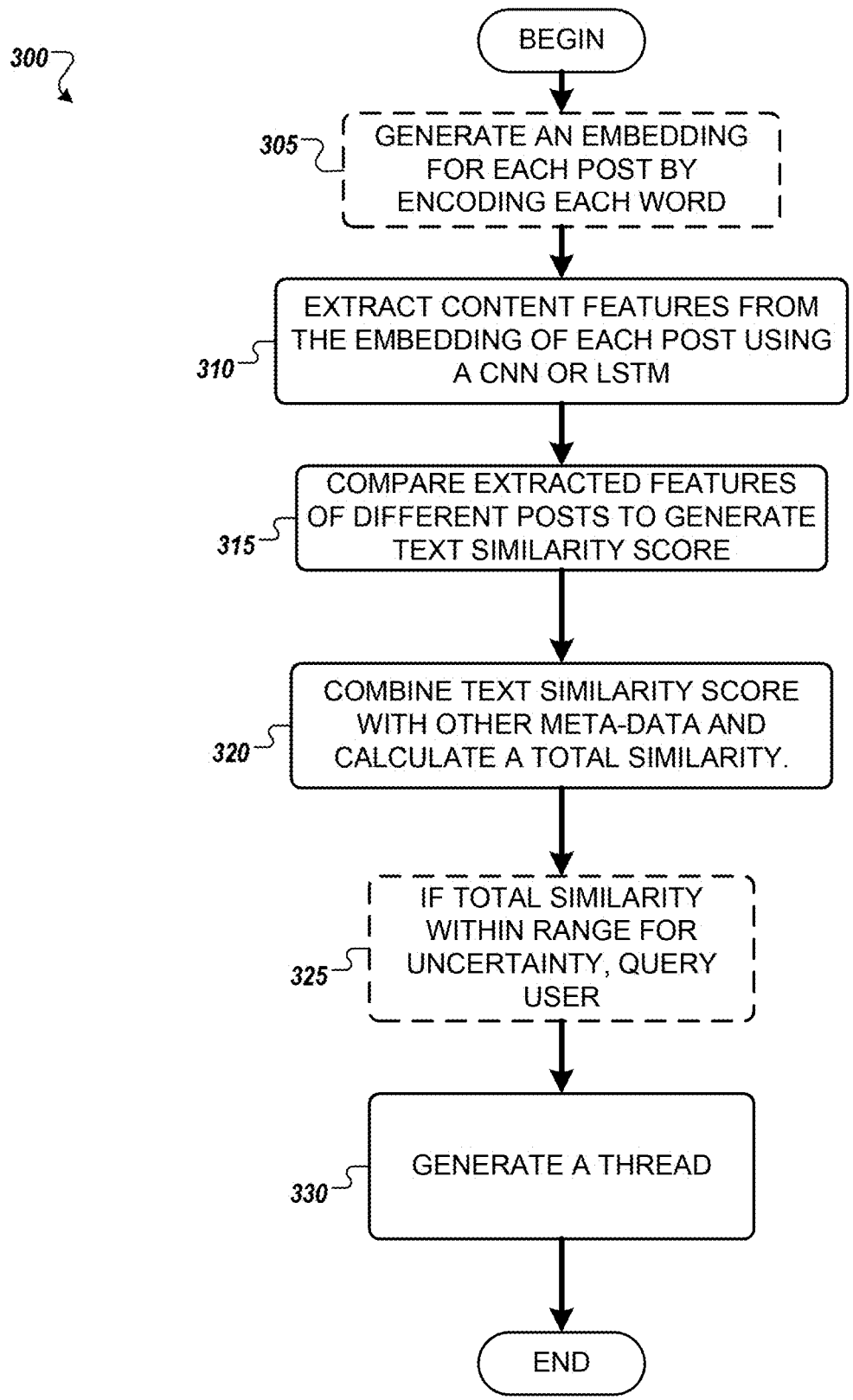
FIG. 3A illustrates a flow chart of a process for generating threads from unstructured messages in accordance with example implementations of the present application.

FIG. 3A illustrates a flow chart of a process 300 for generating threads from unstructured messages in accordance with example implementations of the present application. The process 300 may be performed by a computing device such as the computing device 1505 in the computing environment 1500 of FIG. 5. The process 300 is an alternative process to the process 200 of FIG. 2 for detangling interleaved messages from a chat or messaging platform. Some parts of the process 300 may be similar to parts of the process 200 illustrated in FIG. 2 and the descriptions associated with FIG. 2 may also apply to parts of the process 300 illustrated in FIG. 3A.

In some embodiments of the process 300, an embedding may optionally be generated to represent each word of each post being considered for threading at 305. The embedding may be performed using a neural network as discussed below with respect to FIG. 4. For example, a Siamese neural network may be used to generate the embeddings to represent the words of each post. However, example implementations of the process 300 may not require that the embeddings be generated as part of the process of threading the unstructured chats or posts. For example, the posts or chat messages may be received with embeddings having been pre-defined or defined by another system. Once the embeddings have been obtained (either by being generated at 305 or being received along with the posts), content features may be extracted from each the embedding associated with each post at 310. The content features may be extracted using any word or concept recognition technique that may be apparent to a person of ordinary skill in the art. In some example implementations, the extraction of content features may be performed using a neural network such as a convolutional neural network or a long short-term memory neural network with attention. In some example implementations, the detection of content features may include concatenation of embeddings to identify both local features associated with a portion of the post and global features associated with the entire post.

Once the content features have been extracted from the embedding of each post, the content features of individual posts may be compared to content features extracted from other posts to determine a textual similarity between pairs of individual posts at 315. In some example implementations, the calculation of textual similarity may be focused on posts within a certain timeframe to the number of posts to which comparisons may be made.

After textual similarity scores have been generated between posts, the textual similarity scores may be combined with other meta-data such as timing of posts, location of posts author of post or any other meta-data that might be apparent to a persons of ordinary skill in the art to generate a total similarity score at 320. As discussed below, the total similarity score may be used to identify links between posts, which may be used to assign posts to topic threads. For example, higher total similarity scores may correspond to a greater likelihood of related topics, and lower total similarity scores may correspond to lower likelihood of related topics. Further, by using both textual similarity scores and other metadata associated with the posts, improved confidence of the total similarity score may be obtained.

After the total similarity scores have been calculated between posts, a user may optionally be queried to improve reliability of detection of a link between pairs of posts at 325. For example, if the total similarity score is in a middle range below a threshold determined to be clearly indicative of a link between posts but above a threshold determined to be clearly indicative of no link, a user may be queried to confirm whether the posts are related. The user query may be performed using a User Interface (UI) such as the UIs illustrated in FIGS. 5-14 discuss below. After the total similarity score has been calculated (and any user query has been made, if necessary), posts may be grouped together or clustered based on total similarity scores to generate conversational threads form the originally unstructured posts or messages at 330.

In some example implementations, the Conversation Identification by Similarity Ranking (CISIR) algorithm (Algorithm 1 below) may be used to generate the threads at 330. This CISIR algorithm may focus on the top rated messages having the highest similarity scores. In some example implementations, the CISIR algorithm (Algorithm 1 below) may rely on an assumption that the time difference between two consecutive messages posted in the same conversation is not greater than T hours, where T is a small number. Based on this assumption, there would exist at least one or more other messages in the same conversation posted closely in time. Thus, with the redundancy, a few pairs with stronger confidence, (e.g., the top-ranked pairs) may be enough to extend a correct connectivity to earlier or later messages, while the low-rank pairs can be ignored to reduce the risk of error propagation.

Figure 3B:
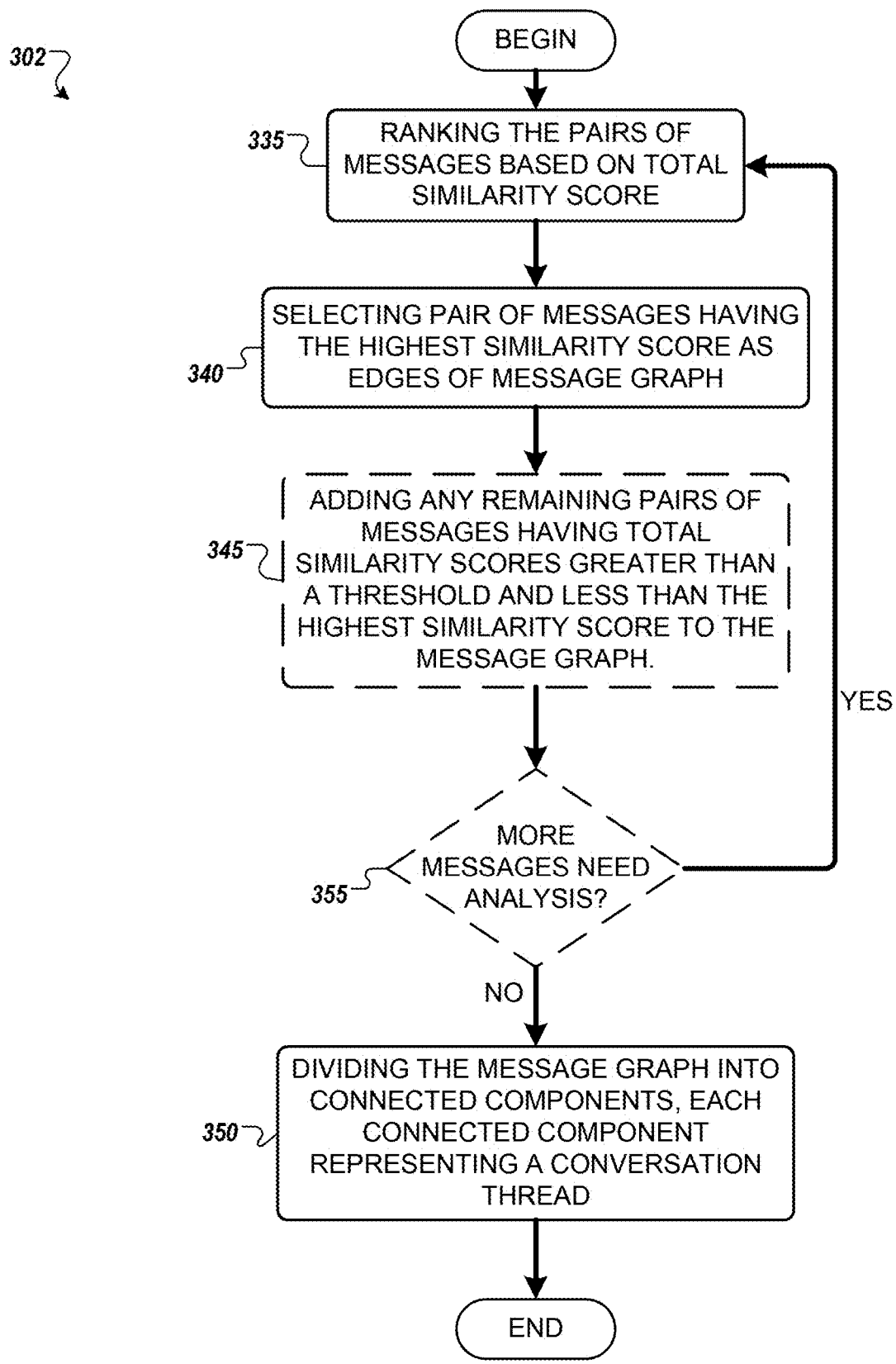
FIG. 3B illustrates a flow chart of a sub-process for generating threads based on similarity score in accordance with example implementations of the present application.

FIG. 3B illustrates a flow chart of a sub-process 302 for generating threads based on the total similarity score using the CISIR algorithm as part of element 330 of FIG. 3A in accordance with example implementations of the present application. Portions of the sub-process 302 may be repeated for each message or post being analyzed.

---

Algorithm 1

---

1  CISIR (M, D, r, h);
   Input : Message set M, the set of selected
          message pairs D, the threshold of
          similarity ranks r and the threshold
          of similarity scores h.
   Output: A set of conversations C
2  Let G = (M, ∅) be an undirected message
   graph
3  for m ∈ M do
4      $D_m$ =
       $\{(m_i, m_j, \hat{y}) \mid m_i = m \lor m_j = m\}$
5      Rank entries in $D_m$ by $\hat{y}$ in a descending
       order
6      for k = 1 to min(r, $|D_m|$) do
7        Let ($m_i$, $m_j$, $\hat{y}$) be the k-th entry in
         ranked $D_m$
8        if $\hat{y}$ < h then
9          break
10       Add an edge ($m_i$, $m_j$) into G
11 C = ConnectedComponents(G)
12 return C

---

Given a set of selected message pairs with estimated similarity scores defined by Equation 1 below, the CISIR algorithm illustrated above illustrates a procedure of CISIR with two parameters r and h, where r is a high threshold of similarity ranks and h is a lower threshold of similarity scores. In some example implementations, the CISIR algorithm may filter out pairs with low scores because a message may have less than r same-conversations posted in its T-hour time window.

$$D_m = \{(m_i, m_j, \hat{y}) \mid m_i = m \lor m_j = m\} \quad \text{(Equation 1)}$$

In the process 302, for each message, the CISIR algorithm may rank all the message pairs associated with the message being considered using an estimated similarity at 335 and only retrieve the top-r pairs, or all pairs if r is less than the number of message pairs, |D|, whose similarity scores are greater than h. These retrieved high-confidence pairs (e.g., the messages having the highest similarity scores or the top-r pairs) are treated as the edges in a message graph G at 340. Optionally, in some example implementations, a UI may also be provided to allow a user to review and approve or reject one or more retrieved pairs to be used as edges of the message graph G at 340.

In some example implementations, any remaining message pairs that have a total similarity score greater than the threshold (h) but less than the highest similarity scores (e.g., not top-r pairs) may optionally also be added to the message graph G at 345. After message pairs have been added to the graph G at 340 (or 345 if optional step 345 is performed), a determination may be made whether additional messages still need analysis at 355. If more messages still need analysis (YES at 355), sub-process 302 may return to 335 and be repeated for another message. If no more messages still need analysis (NO at 355), the sub-process 302 may continue to 350 discussed below.

At 350, the CISIR algorithm may divide the message graph G into connected components, and the messages in each connected component may be treated as a conversation. In some example implementations of sub-process 302, r and h may be set as 5 and 0.5, respective.

In some example implementations, retrieving only the top-r piers having similarity scores that are greater than h when constructing the graph may improve computational efficiency as well as improve the robustness of the algorithm. Additionally, by limiting an amount of time (e.g., delay) between messages or posts may also improve efficiency without hurting performance, as illustrated in the example results provided below.

Using this CISIR algorithm, messages may be connected to generate the threads using sub-process 302. Once sub-process 302 ends, operation may return to process 300 of FIG. 3A at the conclusion of 330. Once the threads have been generated at the conclusion of 330, the process 300 may end.

FIG. 4 illustrates schematic diagram of a Siamese neural network 400 in accordance with example implementations of the present application. As illustrated, the Siamese neural network 400 received a plurality of posts 405A, 405B, each made up a plurality of words ($w_a$, $w_b$ ... $w_n$). As illustrated, the Siamese neural network 400 may encode each word ($w_a$, $w_b$ ... $w_n$) of post 405A, 405B into an embedding 410 that is initialized using, for example the fast text word vectors in crawl-300d-2M.vec. In some example implementations, a neural network 415 (e.g., a CNN or a LSTM with attention) may be used to extract features based on the textual and contextual data representing a post. The extracted features may be compared 425 and a vector or score representing the textual similarity 430 of the two posts is computed and used as to determine whether the posts may be connected in the same thread. In some example implementations, this textual similarity feature may be combined with other features 445 based on meta-data and may also include one or more of:
 IDF-weighted word overlap
 Distance in time between the two posts
 # of other posts between the two posts
 The authors of the two posts, or whether they are the same The combined features (e.g., the text similarity 430 and the other features 445) may be provided to a similarity prediction algorithm 435 that outputs similarity scores 440. The similarity scores 440 may be used to determine the threading of the posts as discussed above.

Figure 5:
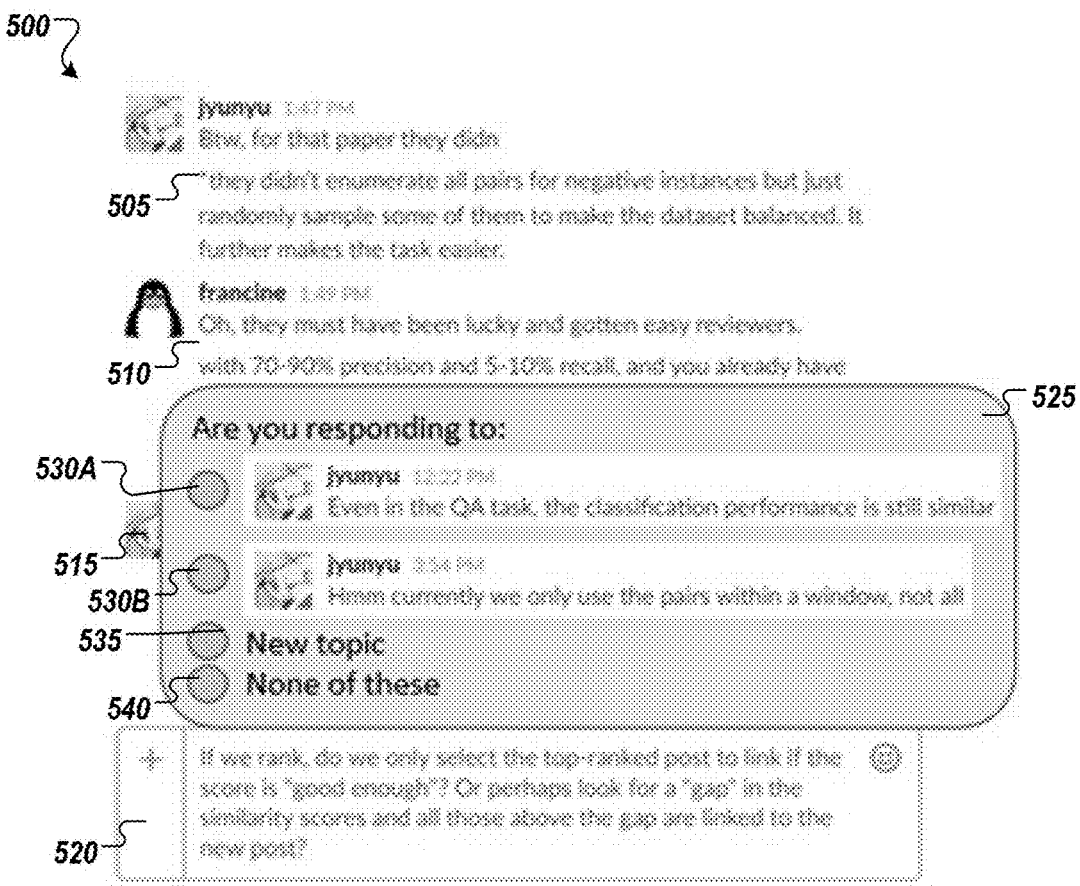
FIG. 5 illustrates a User Interface (UI) to query a user in accordance with example implementations of the present application.

FIG. 5 illustrates a User Interface (UI) 500 that may be used to query a user in accordance with example implementations of the present application. As illustrated, the UI 500 includes a series of previous posts 505,510,515 interleaved together. The UI 500 also includes a text entry box 520 that may be used to draft and revise a new post, message, or chat entry. When it is determined that the new post, message, or chat entry entered into the text entry box 520 should be the subject of a query, a pop-up box 525 may be provided.

The pop-up box 525 includes two selectable buttons associated with previous posts 530A, 530B to which the new post entered in the text entry box 520 may be linked. The pop-up box 525 may also include a selectable button 535 associated with a new topic and a selectable button 540 associated with "NONE OF THESE". The User may use selectable buttons 530A or 530B to link the new message to the identified previous messages. Alternatively, the user may use selectable button 535 to start a new topic thread or selectable button 540 to indicate that the new message is not a new message, but neither of the identified previous messages is the correct thread. The UI 500 is merely an example implementation and other alternatives or modifications may be apparent to a person of ordinary skill in the art.

In some example implementations, the number of queries or pop-up boxes 525 generated may be dependent on the expected number of threads. As the expected number of threads increases, the number of queries may be increased to better cover the greater number of threads.

In addition to threading of posts, example implementations of the present application may also enable other applications such as notifying other users when a post has a reply or a new topic is posted.

Figure 6:
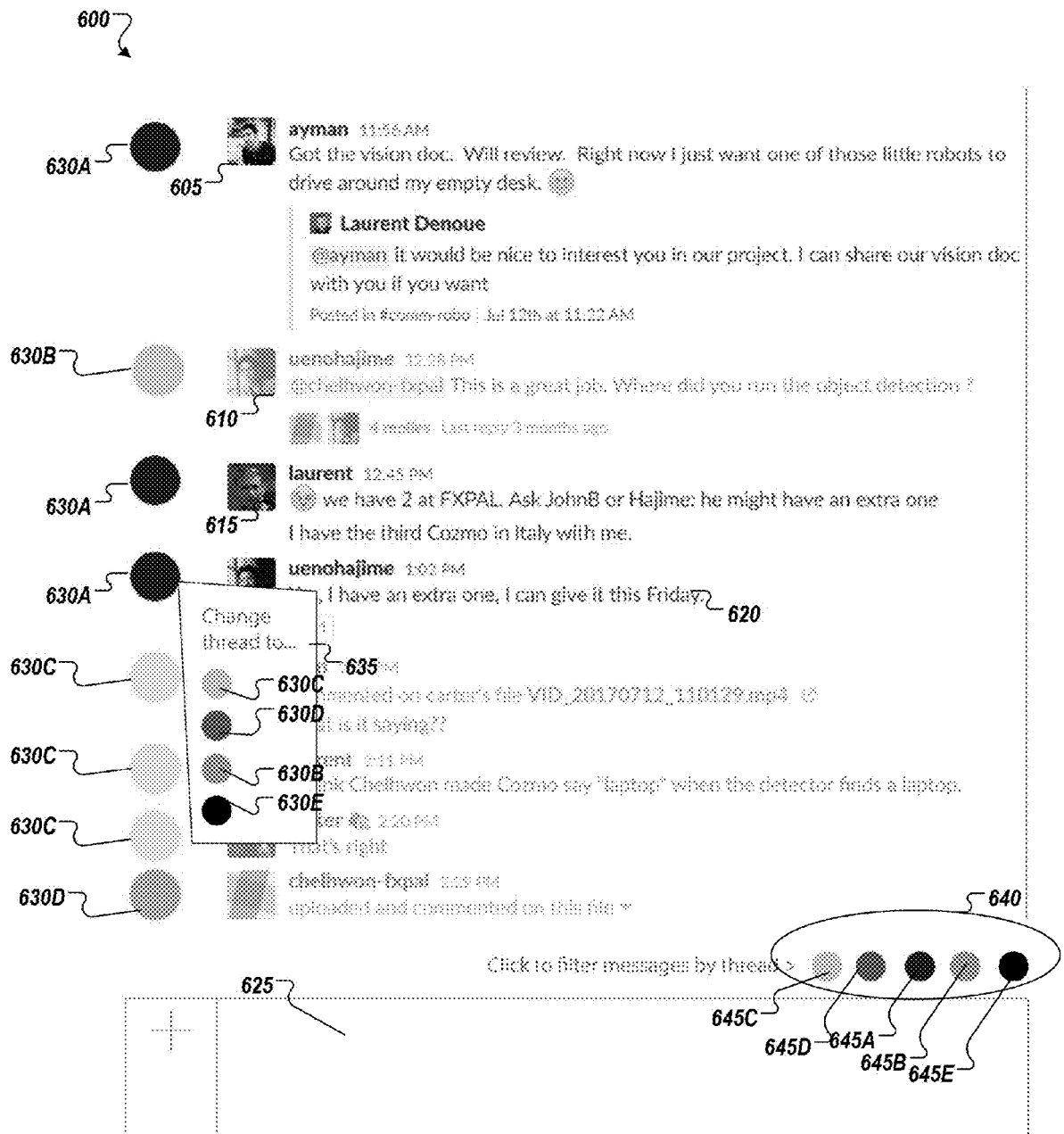
FIG. 6 illustrates another UI in accordance with example implementations of the present application.

FIG. 6 illustrates another UI 600 in accordance with example implementations of the present application. As illustrated, the UI 600 includes a series of previous posts 605,610,615 interleaved together. The UI 600 also includes a text entry box 625 that may be used to draft and revise a new post, message, or chat entry.

In some example implementations, posts which have been identified as belonging to the same thread can be coded or illustrated using a visual reference (e.g., circles 630A-630D) on the UI 600. For example, in FIG. 6, posts in the same thread (e.g., 605, 615, 620) are coded with the same colored circle (630A). In some example implementations, the circles 630A-630D may be used to signal new information, such as flashing to indicate a new topic or reply.

The circles may also respond when selected to allow actions such as correcting a thread label. For example, the UI 600 may also include a pop-up window 635 that includes additional circles (630B-630E) that may be selected by a user to associate a post with a different topic. If a user updates a topic associated with a post, the updated information may be used to update the neural network's detangling model.

The UI 600 may also include a control region 640 that may allow a user to filter the displayed posts or messages based on the associated topics by providing selectable icons (e.g., circles 645A-645E) that the user can select.

Figure 7:
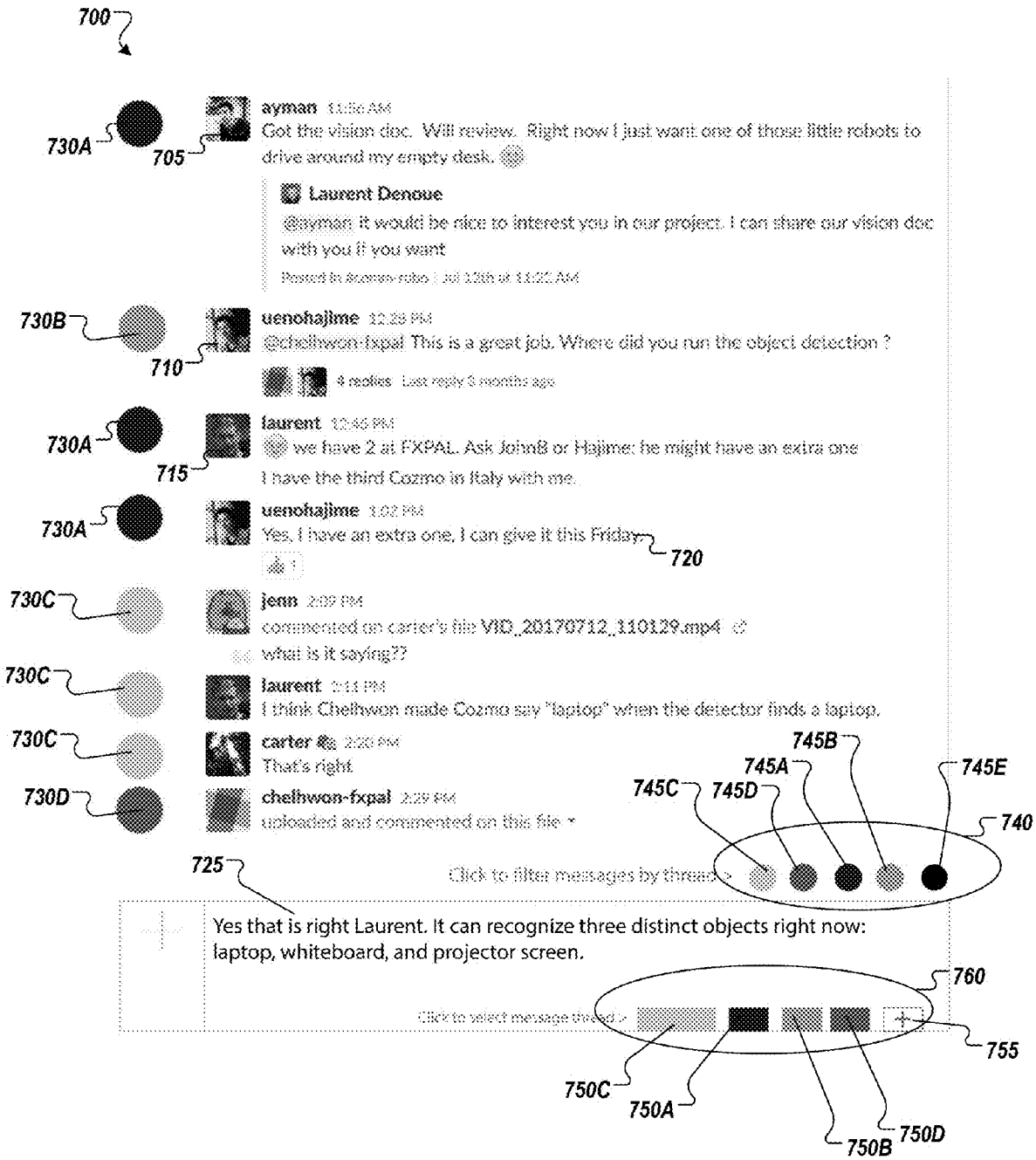
FIG. 7 illustrates another UI in accordance with example implementations of the present application.

FIG. 7 illustrates another UI 700 in accordance with example implementations of the present application. As illustrated, the UI 700 includes a series of previous posts 705,710,715 interleaved together. The UI 700 also includes a text entry box 725 that may be used to draft and revise a new post, message, or chat entry.

In some example implementations, posts which have been identified as belonging to the same thread can be coded or illustrated using a visual reference (e.g., circles 730A-730D) on the UI 700. Similar to the UI 600 discussed above with respect to FIG. 6, in FIG. 7, posts in the same thread (e.g., 705, 715, 720) are coded with the same colored circle (730A). In some example implementations, the circles 730A-730D may be used to signal new information, such as flashing to indicate a new topic or reply.

The UI 700 may also include a control region 740 that may allow a user to filter the displayed posts or messages based on the associated topics by providing selectable icons (e.g., circles 745A-745E) that the user can select.

When querying the user for information, it may be useful for the UI to be as (1) unobtrusive as possible and (2) communicates the value of the response to the user. Toward the first goal (1), the UI 700 of FIG. 7 may include a control interface 760 allowing the user to assign a new comment or message typed into the text entry box 725 to a thread with a single click. As illustrated, the control interface 760 provides a plurality of clickable buttons 750A-750D, each color coded to show an association with the identified topics of the previous posts 705-720. When the user selects a button, the comment or message will be assigned to that thread and added to the channel. In some example implementations, the system may suggest a proposed thread by making the button 750C associated with one thread larger than the other buttons 750A, 750B, 750D. As illustrated in FIG. 7, the system has determined that the new comment likely belongs to the yellow-coded thread, and it has therefore made the yellow button 750C the largest.

Additionally, in some example implementations, the UI 700 may also include a button 750 that is associated with a new topic not previously encountered. For example, as illustrated in FIG. 7, a user can press the "+" button 750 on the far right if the user wants to start a new thread.

Further, in some example implementations, if a user does not want to assign the comment to any thread they can follow regular behavior associated with a chat or message interface and simply press the "enter" or "return" key. With a UI 700, the user may provide feedback to the system unobtrusively with a single click, and normal action of the UI may be unaffected.

Figure 8:
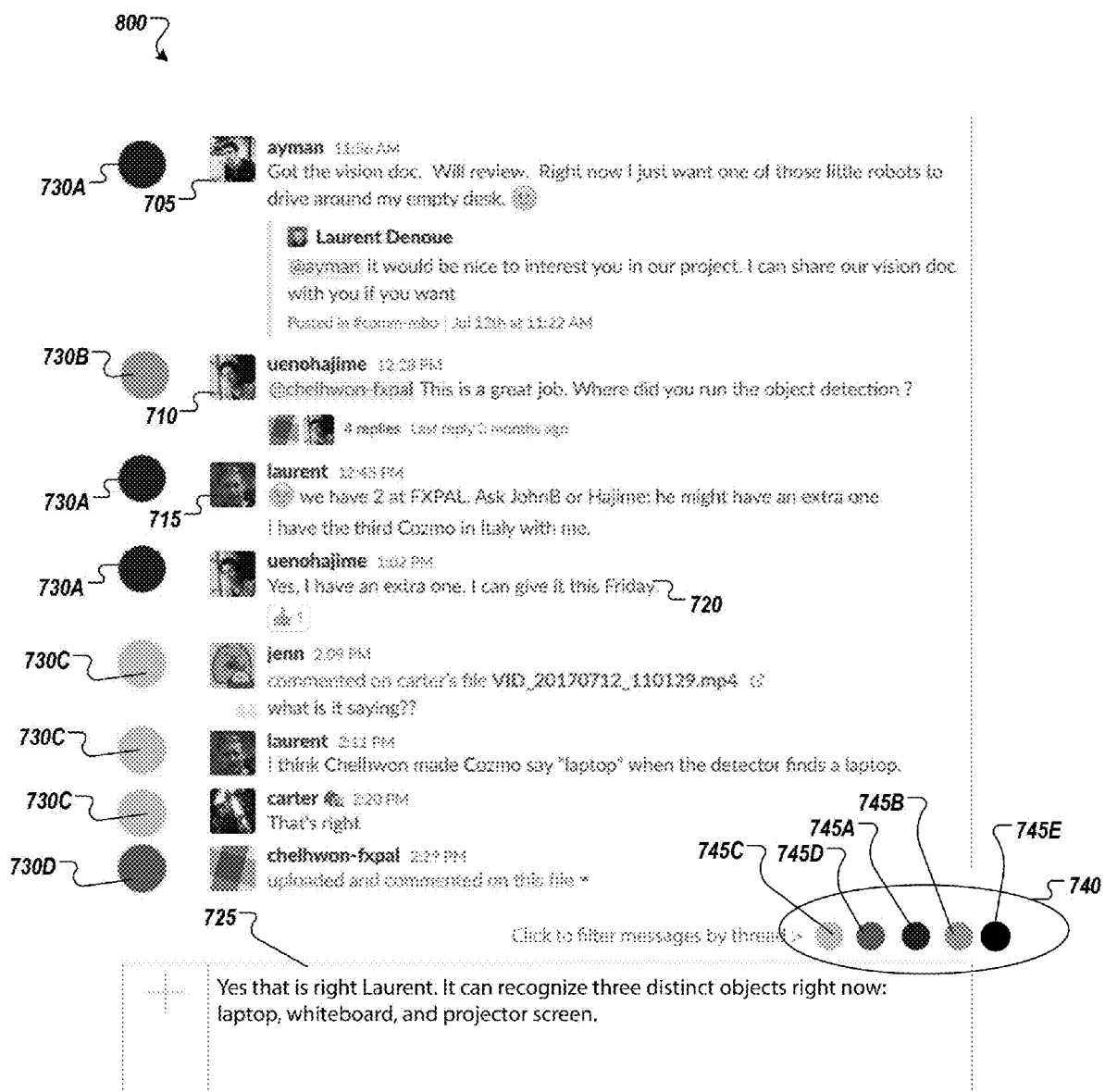
FIG. 8 illustrates another UI in accordance with example implementations of the present application.

FIG. 8 illustrates another UI 800 in accordance with example implementations of the present application. More specifically, UI 800 is a modified version of the UI 700 of FIG. 7 and includes identical reference numerals used to identify corresponding components. Redundant description of these components has been omitted. In FIG. 8, the control interface 760 has automatically been hidden by the system. This may occur when actively learning is employed by the system and the system determines that no input from the user is required to identify the correct thread (e.g., the system confidence is high).

Figures 9A, 9B:
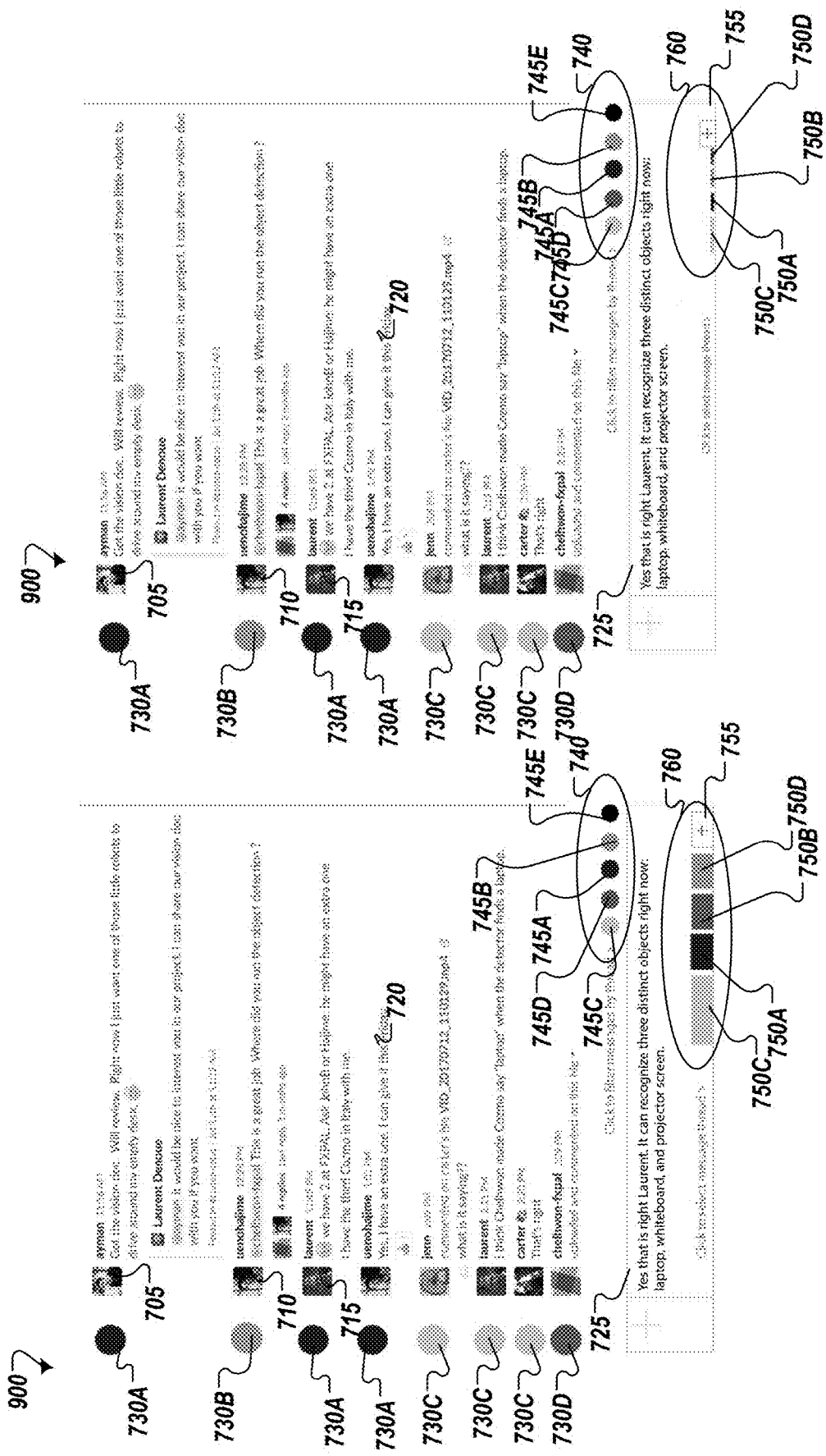
FIGS. 9A and 9B illustrate another UI in accordance with example implementations of the present application.

FIGS. 9A and 9B illustrate another UI 900 in accordance with example implementations of the present application. More specifically, UI 900 is a modified version of the UI 700 of FIG. 7 and includes identical reference numerals used to identify corresponding components. Redundant description of these components has been omitted. In FIGS. 9A and 9B, a user may be given the option to provide feedback or label each post. In FIG. 9A, posts for which the system has low confidence (and thus, is requesting feedback) may be shown with larger thread selection buttons 750A-750D. Conversely, FIG. 9B, posts that the system has high confidence (and thus, is not requesting feedback) may be shown with smaller, less noticeable buttons 750A-750D. Other features of the interface are illustrated and discussed below with respect to FIGS. 10-14.

Figure 10:
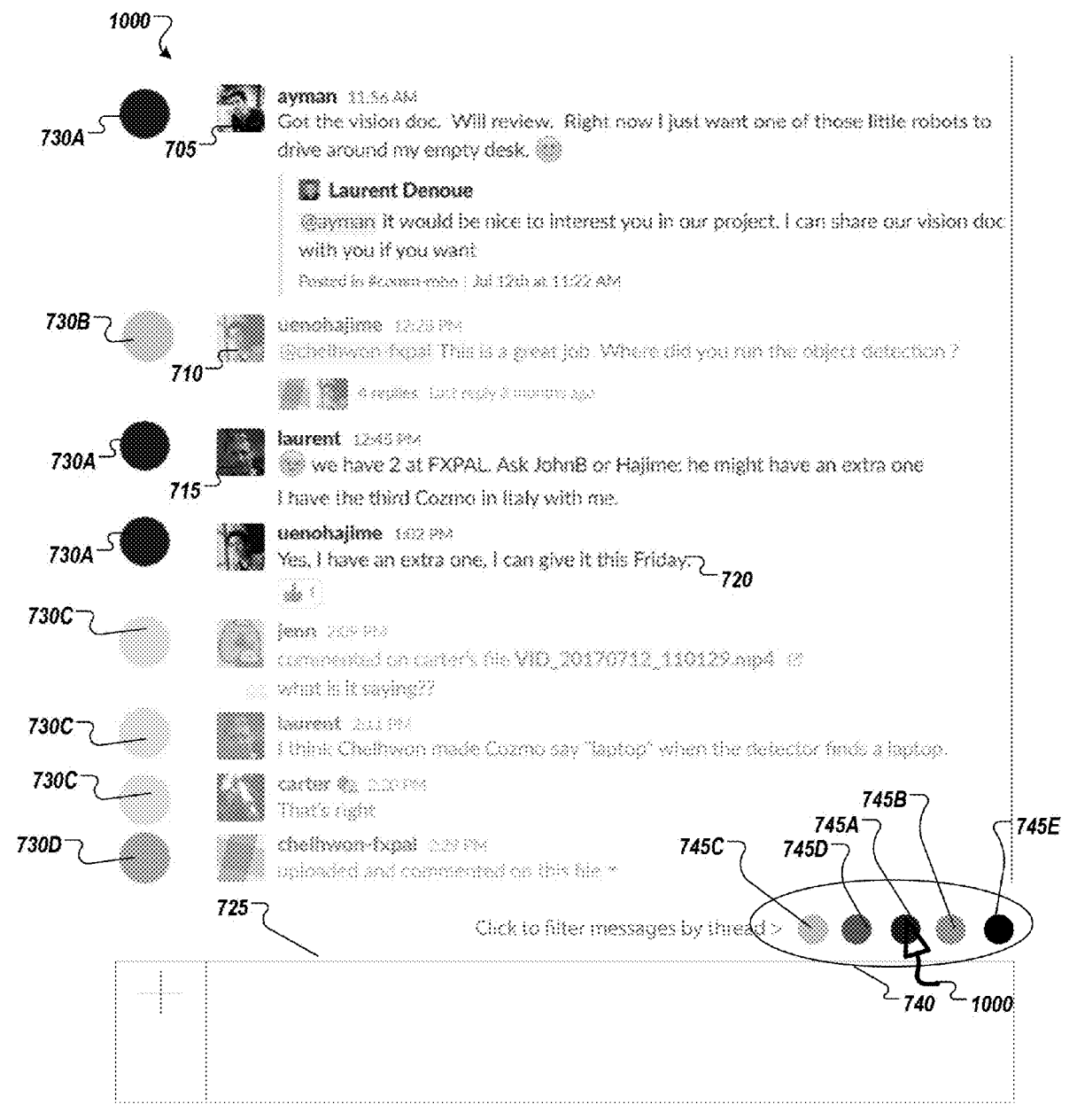
Figure 11:
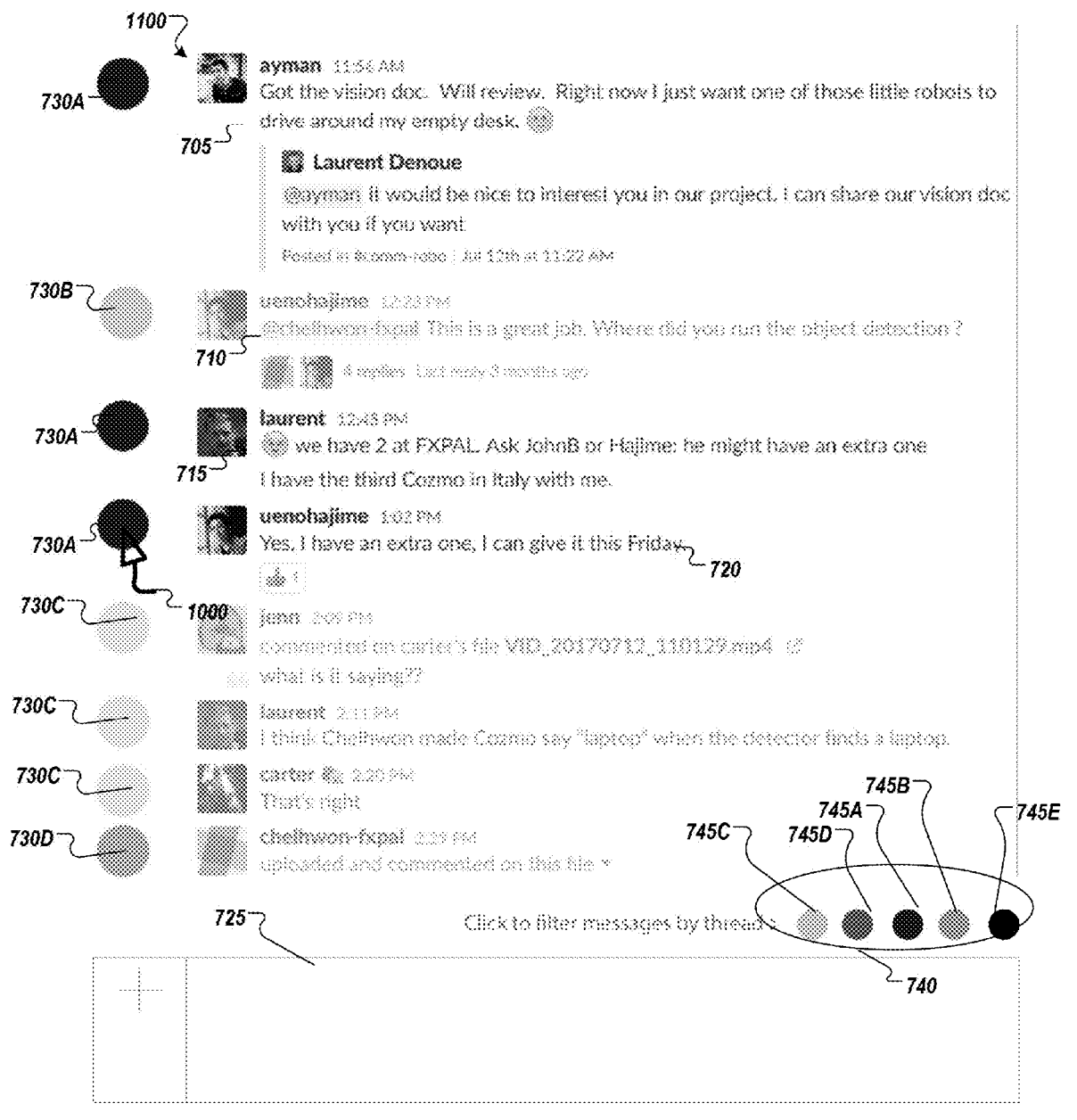
Figure 12:
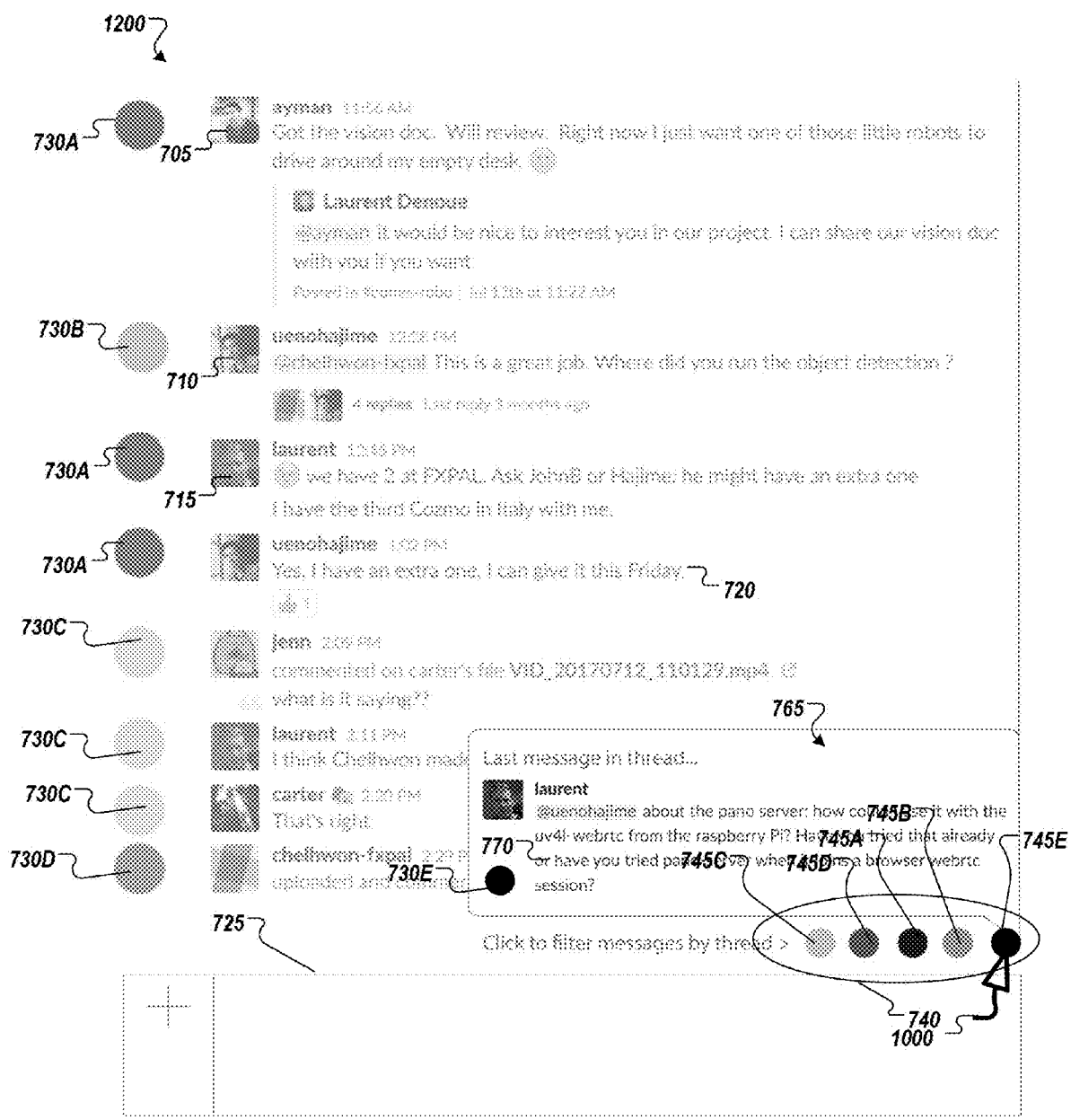
FIG. 12 illustrates another UI in accordance with example implementations of the present application.

FIGS. 10-12 illustrate additional UIs 1000, 1100, and 1200 in accordance with example implementations of the present application. More specifically, UIs 1000, 1100, 1200 are modified versions of the UI 700 of FIG. 7 and includes identical reference numerals used to identify corresponding components. Redundant description of these components has been omitted. FIG. 10 illustrates an example implementation in which the UI 1000 allows a user to hover a cursor 1000 over one of the selectable icons 745A of the control region 740. As illustrated, the UI 1000 highlights messages 705, 715, and 720 associated with the selected thread (blue circles 730A) and de-highlights or "greys-out" the other messages.

Similarly, FIG. 11 illustrates a similar example implementation in which the UI 1100 allows a user to hover a cursor 1000 over one of the visual icons 730A adjacent the one of the messages 715. As illustrated, the UI 1100 highlights messages 705, 715, and 720 associated with the selected thread (blue circles 730A) and de-highlights or "greys-out" the other messages.

Further, FIG. 12 illustrates an example implementation in which the UI 1200 shows the most recent message 770 from the selected thread (black circle 730E) in a popup window 765 when the user hovers the cursor 1000 over a selectable icon 745E associated with a thread from which none of the messages currently in view are associated.

Figure 13:
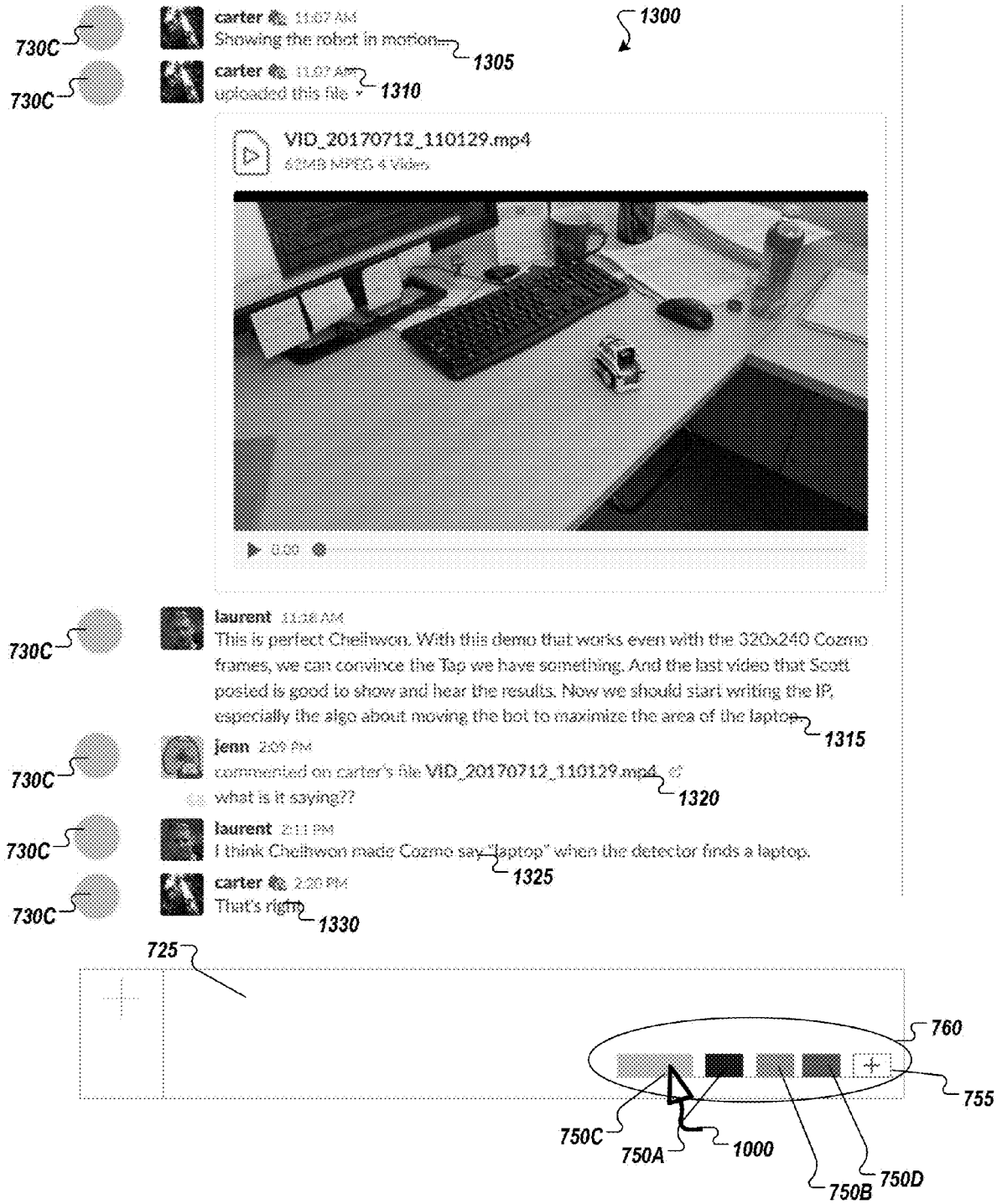
FIG. 13 illustrates another UI in accordance with example implementations of the present application.
Figure 14:
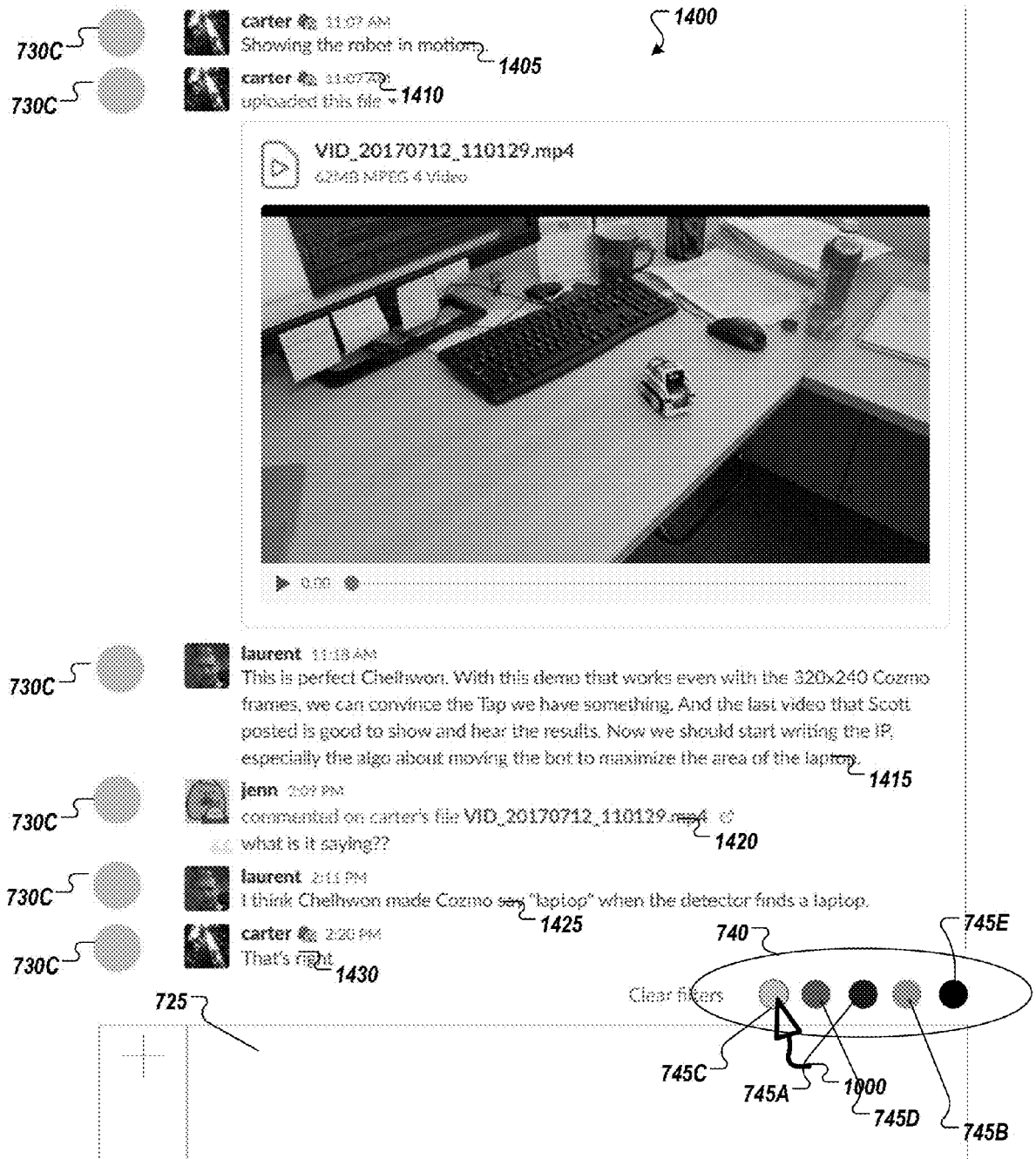
FIG. 14 illustrates another UI in accordance with example implementations of the present application.

FIGS. 13 and 14 illustrate example implementations of additional UIs 1300, 1400 in accordance with example implementations of the present application. The UIs 1300, 1400 illustrate example pop-up UIs that may be produced when a user selects or hovers over a selectable control button in one of the UIs illustrated in FIGS. 7-11 discussed above. For example, in FIG. 13 hovering the cursor 1000 over one of the selection buttons 750A-750D of the control interface 760 (selection button 750C, for example). As illustrated, hovering the cursor 1000 over selection button 750C may cause the UI 1300 to display the most recent messages 1305-1330 in the thread (represented by yellow circle 730C) associated with the selection button 750C.

Alternatively, in FIG. 14 using the cursor 1000 to click one of selectable icons 745A-745E of the control region 740 (selectable icons 745C, for example) may cause the UI 1400 to filter the messages to display only messages 1405-1430 in the thread (represented by yellow circle 730C) associated with the selectable icon 745C. Users may clear their selections at any time to return to the normal view of FIGS. 7-12 discussed above. FIGS. 13 and 14 may allow a user to can rapidly filter the chats in the channel by their assigned thread. In FIG. 13, the user hovering over the filtering icon for the yellow thread as well as the subsequent changes to the UI may allow all of the non-yellow-coded messages to be removed, allowing the user to see more messages from that thread without scrolling. In this way the user may quickly see at least one value of assigning messages to threads, providing them encouragement to improve the system's performance.

Evaluation

To evaluate model performance, pair similarity performance with and without simulated user feedback against models by Elsner and Charniak (2010) as a baseline, as shown in Table 1 below. For evaluation measures, Mean Reciprocal Rank (MRR) and Mean Average Precision (MAP) were used. Each of the measures ranges from 0 (worst) to 1.0 (best). Note that pairs from user feedback, which would influence the active learning performance, are not considered in the evaluation.

TABLE 1

Pair similarity prediction performance with and without active learning

| Dataset | Max # concurrent threads | MRR | MAP |
| --- | --- | --- | --- |
| Baseline (Elsner, logistic reg.) | Gadgets | 34 | 0.7741 | 0.7246 |
| Without feedback | Gadgets | 34 | 0.8183 | 0.7758 |
| With active learning | Gadgets | 34 | 0.8561 | 0.7915 |
| Baseline (Elsner, logistic reg.) | Gadgets | 10 | 0.8754 | 0.8333 |
| Without feedback | Gadgets | 10 | 0.9033 | 0.8766 |
| With active learning | Gadgets | 10 | 0.9231 | 0.8921 |
| Baseline (Elsner, logistic reg.) | iPhone | 202 | 0.3952 | 0.2880 |
| Without feedback | iPhone | 202 | 0.4291 | 0.4282 |
| With active learning | iPhone | 202 | 0.6093 | 0.4399 |
| Baseline (Elsner, logistic reg.) | iPhone | 10 | 0.7935 | 0.7471 |
| Without feedback | iPhone | 10 | 0.8531 | 0.8054 |
| With active learning | iPhone | 10 | 0.8838 | 0.8293 |

For development and evaluation, a year of comments were from posts related to the terms the 'gadgets' and 'iPhone' of online chat board or messaging platforms. Each subcategory of the online chat board was considered to correspond to a chat channel. The comments associated with an original post were considered to form a conversational thread, which were used as the ground truth thread labels. For an initial task, all the threads within a channel were to be detangled. Performance is shown in the rows where maximum numbers of concurrent threads are 34 and 202 for two subcategories of the online chat board, respectively.

For popular categories, there were as many as tens or hundreds of simultaneous threads, which may be unlikely in a chat channel, since the channel would be impossible for a user to follow. Thus, the results with numerous simultaneous threads may provide lower bounds on performance.

To create a more realistic data set, the maximum number of simultaneous threads was limited to 10, and the performance can be observed to increase over when all threads are used. However, even higher performance may be desirable for threading posts. When active learning is employed, with users being queried at a rate of 1 query per 10 posts, the MAP performance improved to 0.8293 (11% and 3% improvement against the baseline and our model without feedback, respectively) for the iPhone subcategory.

Example Computing Environment

Figure 15:
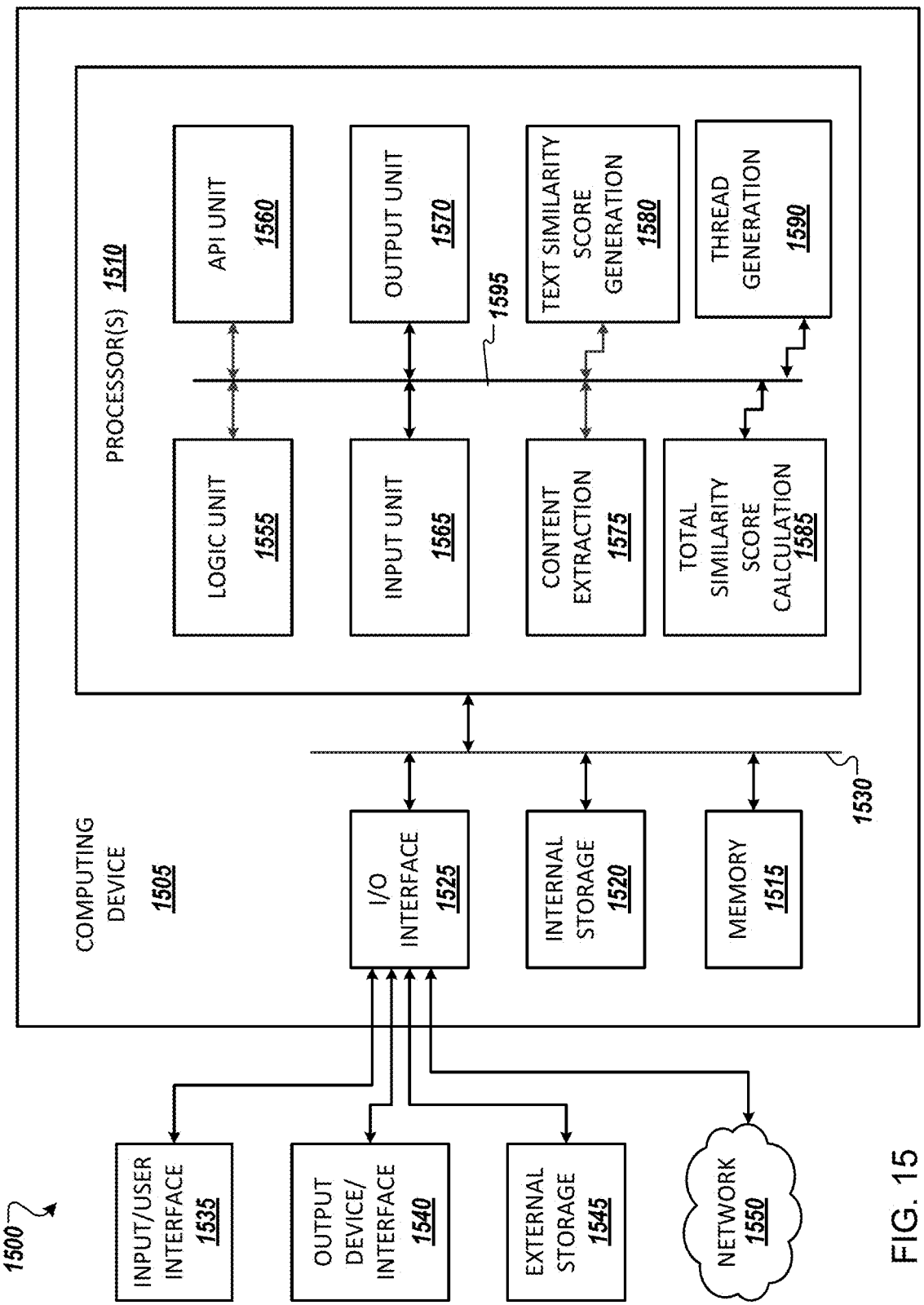
FIG. 15 illustrates an example computing environment with an example computer device suitable for use in some example implementations of the present application.

FIG. 15 illustrates an example computing environment 1500 with an example computer device 1505 suitable for use in some example implementations. Computing device 1505 in computing environment 1500 can include one or more processing units, cores, or processors 1510, memory 1515 (e.g., RAM, ROM, and/or the like), internal storage 1520 (e.g., magnetic, optical, solid state storage, and/or organic), and/or I/O interface 1525, any of which can be coupled on a communication mechanism or bus 1530 for communicating information or embedded in the computing device 1505.

Computing device 1505 can be communicatively coupled to input/user interface 1535 and output device/interface 1540. Either one or both of input/user interface 1535 and output device/interface 1540 can be a wired or wireless interface and can be detachable. Input/user interface 1535 may include any device, component, sensor, or interface, physical or virtual, which can be used to provide input (e.g., buttons, touch-screen interface, keyboard, a pointing/cursor control, microphone, camera, braille, motion sensor, optical reader, and/or the like). Output device/interface 1540 may include a display, television, monitor, printer, speaker, braille, or the like. In some example implementations, input/user interface 1535 and output device/interface 1540 can be embedded with, or physically coupled to, the computing device 1505. In other example implementations, other computing devices may function as, or provide the functions of, an input/user interface 1535 and output device/interface 1540 for a computing device 1505.

Examples of computing device 1505 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 1505 can be communicatively coupled (e.g., via I/O interface 1525) to external storage 1545 and network 1550 for communicating with any number of networked components, devices, and systems, including one or more computing devices of the same or different configuration. Computing device 1505 or any connected computing device can be functioning as, providing services of, or referred to as a server, client, thin server, general machine, special-purpose machine, or another label.

I/O interface 1525 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 1500. Network 1550 can be any network or combination of networks (e.g., the Internet, local area network, wide area network, a telephonic network, a cellular network, satellite network, and the like).

Computing device 1505 can use and/or communicate using computer-usable or computer-readable media, including transitory media and non-transitory media. Transitory media includes transmission media (e.g., metal cables, fiber optics), signals, carrier waves, and the like. Non-transitory media included magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1505 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1510 can execute under any operating system (OS) (not shown), in a native or virtual environment. One or more applications can be deployed that include logic unit 1555, application programming interface (API) unit 1560, input unit 1565, output unit 1570, content extraction unit 1575, text similarity score generator 1580, total similarity score calculation unit 1585, thread generation unit 1590, and inter-unit communication mechanism 1595 for the different units to communicate with each other, with the OS, and with other applications (not shown). For example, content extraction unit 1575, text similarity score generator 1580, total text similarity score calculation unit 1585, thread generation unit 1590 may implement one or more processes shown in FIGS. 1-3B. The described units and elements can be varied in design, function, configuration, or implementation and are not limited to the descriptions provided.

In some example implementations, when information or an execution instruction is received by API unit 1560, it may be communicated to one or more other units (e.g., logic unit 1555, input unit 1565, content extraction unit 1575, text similarity score generator 1580, total similarity score calculation unit 1585, thread generation unit 1590). For example, the content extraction unit 1575 may extract content features based on embeddings associated with each post being analyzed and provide the extracted features to text similarity score generator. Further, the text similarity score generator 1850 may receive the extracted content features and generate the text similarity score based on the extracted content features. Further, the total similarity score calculation unit 1585 may use the generated text similarity score to calculate a total similarity score based on the text similarity score and other metadata associated with each message or chat. Finally, the thread generation unit 1590 may generate a conversational thread based on the calculated total similarity score.

In some instances, the logic unit 1555 may be configured to control the information flow among the units and direct the services provided by API unit 1560, input unit 1565, content extraction unit 1575, text similarity score generator 1580, text similarity score calculation unit 1585, and thread generation unit 1590 in some example implementations described above. For example, the flow of one or more processes or implementations may be controlled by logic unit 1555 alone or in conjunction with API unit 1560.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A method of analyzing unstructured messages, the method comprising:
   extracting a content feature from an embedding associated with each message from a pair of unstructured messages using a first neural network;
   generating, based on extracted content features, a text similarity score between the pair of messages using a second neural network, wherein the generating the at least one message thread comprises:
for an unstructured message, ranking a plurality of pairs of messages associated with the unstructured message based on the total similarity score,
receiving a user input identifying one or more pairs of messages from the ranked plurality of pairs of messages,
selecting at least one pair of messages based on a combination of the user input and the highest total similarity score, and
using the selected at least one pair of messages as at least one of the edges of a message graph;
combining the generated text similarity score with additional data associated with the messages to generate a total similarity score; and
generating a message thread based on the generated total similarity score for the pair of messages selected from the plurality of unstructured messages.

2. The method of claim 1, wherein the generating at least one message thread comprises:
detecting a link between each message of the pair of messages based on the generated total similarity score exceeding a link threshold.

3. The method of claim 2, wherein the generating the message thread comprises receiving a user input indicative of a link based on the generated total similarity being in an uncertainty range that is less than the link threshold and greater than a non-link threshold.

4. The method of claim 3, wherein the user input indicative of the link is received in response to a user query transmitted to a user in response to the generated total similarity being calculated to be in the uncertainty range.

5. The method of claim 4, wherein the transmitted user query comprises a proposed link and a request that the user provide a confirmation.

6. The method of claim 4, further comprising retraining the second neural network based on the user input.

7. The method of claim 4, further comprising generating a visualization based on the message thread, the visualization comprising each message of the pair of messages and an icon indicative of a detected link between each message of pair of messages.

8. The method of claim 7, wherein the visualization further comprises a user interface providing the user query to the user in response to the generated total similarity being calculated to be in the uncertainty range.

9. The method of claim 7, further comprising updating the visualization to emphasize one or more detected links associated with a message selected from the messages based on a user input.

10. The method of claim 7, wherein the visualization further comprises a user selectable icon indicative that the unstructured message selected from the plurality of unstructured messages is not linked with any other unstructured message selected from the plurality of unstructured messages.

11. The method of claim 1, wherein the generating the at least one message thread based on the generated total similarity score further comprises:
selecting another at least one pair of messages from the ranked plurality of pairs of messages based on a highest total similarity score and using the selected another at least one pair of messages as another at least one of the edges of the message graph; and
dividing the message graph into connected components, each connected component representing a conversation thread.

12. The method of claim 1, wherein the generating the at least one message thread based on the generated total similarity score further comprises dividing the message graph into connected components, each connected component representing a conversation thread.

13. A non-transitory computer readable medium having stored therein a program for making a computer execute a method of analyzing a corpus comprising a plurality of unstructured messages, the method comprising:
extracting a content feature from an embedding associated with each message from a pair of unstructured messages using a first neural network;
generating, based on extracted content features, a text similarity score between the pair of messages using a second neural network, wherein the generating the at least one message thread comprises:
for an unstructured message, ranking a plurality of pairs of messages associated with the unstructured message based on the total similarity score,
receiving a user input identifying one or more pairs of messages from the ranked plurality of pairs of messages,
selecting at least one pair of messages based on a combination of the user input and the highest total similarity score, and
using the selected at least one pair of messages as at least one of the edges of a message graph;
combining the generated text similarity score with additional data associated with the messages to generate a total similarity score; and
generating a message thread based on the generated total similarity score for the pair of messages selected from the plurality of unstructured messages.

14. The non-transitory computer readable medium of claim 13, wherein the generating at a message thread comprises detecting a link between each message of the pair of messages based on the generated total similarity score exceeding a link threshold.

15. The non-transitory computer readable medium of claim 14, wherein the generating a message thread comprises receiving a user input indicative of a link based on the generated total similarity being in an uncertainty range that is less than the link threshold and greater than a non-link threshold.

16. The non-transitory computer readable medium of claim 13, wherein the user input indicative of the link is received in response to a user query transmitted to a user in response to the generated total similarity being calculated to be in the uncertainty range.

17. The non-transitory computer readable medium of claim 16, further comprising generating a visualization based on the message thread, the visualization comprising each message of the one pair of messages and an icon indicative of a detected link between each message of the at least one pair of messages.

18. The non-transitory computer readable medium of claim 13, wherein the generating the at least one message thread based on the generated total similarity score further comprises:
selecting another at least one pair of messages from the ranked plurality of pairs of messages based on a highest total similarity score and using the selected another at least one pair of messages as another at least one of the edges of the message graph; and dividing the message graph into connected components, each connected component representing a conversation thread.

19. The non-transitory computer readable medium of claim 13, wherein the generating the at least one message thread based on the generated total similarity score further comprises dividing the message graph into connected components, each connected component representing a conversation thread.

20. A computer apparatus configured to analyze a corpus comprising a plurality of unstructured messages, the computer apparatus comprising:
   a memory storing a plurality of unstructured messages and an embedding associated with each of the plurality of unstructured messages; and
   a processor executing a process comprising:
      extracting a content feature from an embedding associated with each message from a pair of unstructured messages using a first neural network;
      generating, based on extracted content features, a text similarity score between the pair of messages using a second neural network, wherein the generating the at least one message thread comprises:
         for an unstructured message from the plurality of unstructured messages, ranking a plurality of pairs of messages associated with the unstructured message based on the total similarity score,
         receiving a user input identifying one or more pairs of messages from the ranked plurality of pairs of messages,
         selecting at least one pair of messages based on a combination of the user input and the highest total similarity score, and
         using the selected at least one pair of messages as at least one of the edges of a message graph;
      combining the generated text similarity score with additional data associated with each pair of messages to generate a total similarity score for each pair of messages; and
      generating at least one message thread based on the generated total similarity score for at least one pair of messages selected from the plurality of unstructured messages.

21. The computer apparatus of claim 20, wherein the processor is further configured to generate the at least one message thread based on the generated total similarity score by:
   selecting another at least one pair of messages from the ranked plurality of pairs of messages based on a highest total similarity score and using the selected another at least one pair of messages as at least one of the edges of the message graph; and
   dividing the message graph into connected components, each connected component representing a conversation thread.

22. The computer apparatus of claim 20, wherein the processor is further configured to generate the at least one message thread based on the generated total similarity score by dividing the message graph into connected components, each connected component representing a conversation thread.

* * * * *